2,812,817

METHOD OF INCREASING CRUDE OIL RECOVERY BY SECONDARY RECOVERY METHOD EMPLOYING A WATER DRIVE

Allyn T. Sayre, Jr., Crystal Lake, Ill., assignor to The Pure Oil Company, Chicago, Ill., a corporation of Ohio No Drawing. Application June 27, 1955,
Serial No. 518,391

11 Claims. (Cl. 166—9)

This invention relates to improving the efficiency of mineral oil production from subterranean reservoirs by secondary recovery methods. It more specifically relates to the use of surface-active agents for modifying the interfacial tension relationships that exist in a reservoir system during the use of a water flood in secondary recovery operations.

In secondary recovery procedures using a water flood, the wettability of the formation and the interfacial tension between the two phases are important factors affecting the oil-displacement efficiency of the advancing flood front. Because of the known ability of a number of surface-active agents to promote the wetting of solid surfaces by liquids, including oil and water, and to lower the interfacial tension between oil and water, these agents have been widely used in various methods for increasing the ultimate production of oil. In some instances, the wettability of a reservoir is modified by introducing into a siliceous formation, sometimes partially oil-wettable, a substance which will make it preferentially water-wettable. In addition to changing wettability, these agents also lower the interfacial tension between the oil and displacing water, which results in more effective removal of oil. During water injection without these agents, much of the residual oil in the less permeable parts of a reservoir will not be removed by the flood water because the water takes the path of least resistance and flows through the more permeable sections. Water-flooding carried out under these conditions will displace most of the oil held in the large capillaries, but only little of the oil held in the small capilaries is dispaced from the reservoir. In recovering or displacing the oil retained in the small capillaries, the release of the oil is facilitated by modifying the interfacial tension relationships of the reservoir system. To this end, certain chemicals which will not react with the oil may be introduced into the formation. These surface-active agents collect at the interfaces between the water and the mineral surface, and between the oil and water, influencing the interfacial tension relationships of the system. The use of surface-active agents in this service makes the mineral surfaces water-wet, which condition repels the oil. In addition, these agents also lower the interfacial tension between the oil and water, and facilitate the movement of oil from the pores by water. In order to be beneficial and increase oil recovery, these effects must occur in a small depth of face at the front of the water drive. Therefore, it is not entirely satisfactory to simply add surface-active agents directly to the water prior to introducing the flood water into the formation. When surface-active agents are introduced into the formation in this manner, they are usually absorbed on the sand surfaces and are not continually present in the flood front where they are most effective.

It is, therefore, a primary object of this invention to employ surface-active agents in water-flooding operations, and to obtain their maximum effect by maintaining them ahead of and at the flood front during the water drive. This and other objects and advantages of the instant invention will be made more apparent from the following detailed description of the instant invention.

According to the instant invention, a surface-active agent in the gaseous phase is injected into the residual-oil-containing reservoir prior to the introduction of the flood water into the reservoir. The surface-active agent may be a wetting agent per se, or may be a substance which upon hydrolysis will be converted to a wetting agent, and is chosen so that it can be dispersed and suspended in a gaseous carrier. The agent used may be any that can be volatilized and carried into the reservoir by the injected gas. Examples of suitable materials include, but are not limited to, water-soluble, volatile agents, such as chlorosilanes, e. g. methyltrichlorosilane, dimethyldichlorosilane, trimethylchlorosilane; organo perfluoroacids, e. g. heptafluorobutyric acid, perfluoropropionic acid; acyl chlorides, e. g. benzoyl chloride, para-methyl benzoyl chloride, benzene sulfonyl chloride; ammonia-producing substances, e. g. ammonium hydroxide, liquid ammonia, etc. Others obvious to those skilled in this art are also equally applicable.

During the preliminary treating of the formation, the gas containing the volatile water-soluble agent moves through the reservoir in the gas channels previously established in the oil zone during primary depletion. Thus, the gas is continually surrounded by oil and does not lose its surface-active material to the connate water present in the reservoir. If part of the wetting agent is absorbed by the water, or adsorbed by the formation, it is nevertheless available for modifying the surface tension relationships when the flood front moves through the reservoir. As water is injected for the flood, it displaces the gas containing the surface-active agent ahead of the oil bank which is formed. However, because of the relative permeability of the gas phase in the reservoir, some of the gas is not displaced by the moving oil bank. This undisplaced gas remains available and comes in contact with the displacing flood water right at the flood front. As the water-front moves through the reservoir, the scrubbing action of the water removes the surface-active material from the gas phase and causes a lowering of interfacial tension between the water and oil at and immediately behind the flood front. This lowering of the interfacial tension between the oil and water at the flood front brings about increased oil recovery beyond that previously possible. The process continues as long as the injection gas containing the surface-active material is displaced ahead of or along with the flood front.

The required volume of injection gas will vary from reservoir to reservoir, but in general is controlled by the equilibrium gas saturation of the reservoir during the simultaneous flow of oil and gas. The amount of gas required can readily be determined by relative permeability tests on core samples in the laboratory. A suitable laboratory method for determining relative permeability is described in Petroleum Transaction, AIME, vol. 195, page 187 et seq., 1950. The gas injection pressure and rate of injection are controlled by the capacity of the gas injecting system and physical characteristics of the formation, but the gas should be injected at the highest rate that is mechanically and economically possible.

The amount of surface-active agent used depends upon its volatility in the carrier gas. The amount volatilized can be increased by heating the surface-active material at the surface before the gas is bubbled through it. The agent should not be heated to a temperature exceeding reservoir temperature. The amounts of the agent used will depend on the specific compounds, but the range usually is from 10 to 50 grams of agent per 1000 cu. ft.

of gas, with an average of around 25 grams. The amounts of gas injected depend on the amount and permeability of the sand present in the well. The injection rate generally ranges from 50 MCF. to 2000 MCF./day, with an average of around 500 MCF./day of gas injected.

The surface-active agent employed in carrying out the instant invention is chosen from those which will effectively reduce the interfacial tension relationships between the crude oil and the flood water. It must be capable of being converted to a gaseous state and retained in a gaseous carrier so that it may be readily introduced into the reservoir. It is preferred that a material which functions as a surface-active agent per se be employed, but, as it will be noted from the foregoing illustrative examples, substances which can be converted into surface-active agents by hydrolysis can be used, e. g. acyl halides. The carrier gas employed for introducing the surface-active agent into the formation may be any gas which will not react with the reservoir constituents to form pore-clogging precipitates. Suitable carrier gases include natural gas, nitrogen, carbon dioxide, etc. Natural gas is preferred since it is normally readily available, and may be injected economically. However, it may be desired to employ carbon dioxide for whatever supplemental effect in enhancing drainage efficiency can be obtained from its reaction with various substances, often present in crude petroleum, to produce unstable compounds which may be effective in releasing adherent oil from the reservoir surfaces.

In employing the instant invention as an aid for promoting the efficiency of water-flooding operations, conventional water-flooding practice may be employed with regard to the arrangement of injection and producing wells. An one of a number of different methods of conducting flooding operations can be employed, such as circular flood, line flood, and the intensive system, including five-spot and seven-spot systems, as well as others. In introducing the surface-active agent-containing gas into the formation, conventional flooding apparatus, suitably modified by the addition of a compressor unit in the injection fluid flow-lines, can be employed for introducing the gas into the formation prior to the injection of the flood water. The surface-active agent, or substance capable of being converted into a surface-active agent, is introduced into the carrier gas by direct injection, or by bubbling the carrier gas through the surface-active agent maintained in the liquid state, thereby saturating the carrier gas. The instant invention is illustrated by the following specific embodiment which demonstrates a preferred method for carrying it out.

The oil-producing field to be treated has been partially depleted by primary operations and is now being redeveloped for secondary recovery operations. The field is being converted to a ten-acre, five-spot pattern. The siliceous producing zone is ten feet thick and has a porosity of 20% at a depth of 2200 feet. The total volume of surfactant-containing gas to be injected is approximately equal to the equilibrium gas saturation in the presence of water, as determined from gas-water relative permeability curves based on laboratory findings. The equilibrium gas saturation for this reservoir is 12% of the pore volume. The total amount of gas to be injected is 105,000 cu. ft. at reservoir conditions, viz., a pressure of 700 p. s. i. g. and a temperature of 100° F. The reservoir volume is equivalent to approximately 5,000,000 cu. ft. of gas at standard conditions. For this amount of total gas injected approximately 220 bbls. of surface-active agent is required.

A natural gas, having the following composition: $CH_4$—90.5%, $C_2H_6$—5%, $CO_2$—0.5%, $N_2$—4.0%, is employed as the carrier gas. Benzoyl chloride is introduced into the gas stream by means of a suitable dispenser to effect the substantial saturation of the carrier gas. The benzoyl chloride-containing gas is injected into the injection well at a surface injection pressure of 800 p. s. i. g.

The gas enters the gas channels established during primary depletion, and, as a result of interfacial tension relationships, the gas is completely surrounded with oil during injection. This minimizes any contact with interstitial water. After all of the gas has been injected into the reservoir, water injection is started employing conventional techniques.

The injected water begins displacing oil and gas ahead of the flood front, and the gas containing the surface-active agent precursor is present at the flood front when the water front moves into the reservoir. The saturation of gas at the flood front will be equal to the equilibrium gas saturation, viz, 12%. As the water contacts this gas, it scrubs the water-soluble surface-active agent precursor, benzoyl chloride, out of the gas, hydrolyzing it to produce benzoic acid, a surface-active agent, which lowers the interfacial tension between the displacing water and the displaced oil. This increases the oil recovery in the section swept by the water. The oil accumulates and forms a bank ahead of the front. This process continues until the injected water breaks through in the producing well. The gas containing the surface-active agent moves ahead of the flood front, and a minimum gas saturation of 12% is always present at the flood front.

Because the surface-active agent employed is continuously present throughout the entire formation, the recovery of oil is increased over that obtained by conventional water-flooding operations where the supply of any surface-active agent introduced with the flood water is depleted by the adsorption of the agent on the formation rock. Accordingly, large amounts of surface-active agents are not required in the process of the instant invention, and the economy of water flooding operations is improved.

To facilitate a definition of the instant invention it is to be understood that the expression "surface-active agent" is intended to include substances or compositions which not only inherently manifest the ability to modify advantageously the interfacial tension relationships of the aqueous reservoir system but also those surface-active agent precursors which upon hydrolysis produce products which exhibit this property.

Therefore, I claim:

1. A process for improving the drainage efficiency of an oil-containing rock reservoir which has been partially depleted by primary production methods and wherein there exists water-free, gas channels within the oil zone of said reservoir, which comprises injecting into said reservoir through said gas channels a carrier gas having dispersed therein a volatilizable surface active agent which is in the gasiform state at ambient formation temperatures during said injecting, said gas being employed in an amount sufficient to effect equilibrium gas saturation of the portion of said reservoir traversed by said gas channels with said surface-active agent-containing gas, and thereafter forcing an aqueous flooding agent through the portion of the reservoir traversed by said gas channels under suitable conditions to recover at least a portion of residual oil retained in said reservoir.

2. A process in accordance with claim 1 in which the surface-actant agent is a chlorosilane.

3. A process in accordance with claim 1 in which the surface-actant agent is an organo perfluoroacid.

4. A process in accordance with claim 1 in which the surface-active agent is an acyl chloride.

5. A process in accordance with claim 1 in which the surface-active agent is an ammonia-producing substance.

6. A process in accordance with claim 1 in which said carrier gas is saturated with the surface-active agent.

7. A process for improving the drainage efficiency of an oil-containing rock reservoir which has been partially depleted by primary production methods and wherein there exists water-free, gas channels within the oil zone of said reesrvoir, which comprises injecting into said reservoir through said gas channels a carrier gas in an amount sufficient to effect the equilibrium gas saturation of the portion of the reservoir transversed by said gas channels and having dispersed therein 10–50 grams/1000 ft.$^3$ of said carrier gas a volatilizable surface-active agent which is in the gasiform state at ambient formation temperatures during said injecting and thereafter forcing an aqueous flooding agent through the portion of said reservoir traversed by said gas channels under suitable conditions to recover at least a portion of residual oil retained in said reservoir.

8. A process in accordance with claim 7 in which the surface-active agent is a chlorosilane.

9. A process in accordance with claim 7 in which the surface-actant agent is an organoperfluoroacid.

10. A process in accordance with claim 7 in which the surface-actant agent is an acyl chloride.

11. A process in accordance with claim 7 in which the surface-actant agent is an ammonia-producing substance.

References Cited in the file of this patent

UNITED STATES PATENTS

| | | |
|---|---|---|
| 2,469,354 | Bond | May 10, 1949 |
| 2,669,306 | Teter et al. | Feb. 16, 1954 |

OTHER REFERENCES

Kinney et al.: "Wettability," World Oil, vol. 132, No. 4, March 1951, pages 145, 146, 148, 150 and 154.